United States Patent
Kim et al.

(10) Patent No.: US 9,108,695 B2
(45) Date of Patent: Aug. 18, 2015

(54) FOLDABLE SCOOTER

(71) Applicant: Lit Scooters Corporation, San Francisco, CA (US)

(72) Inventors: Daniel Kee Young Kim, San Francisco, CA (US); Scott Lananna, Royal Oak, MI (US); Isao Takezawa, San Francisco, CA (US)

(73) Assignee: Lit Scooters Corporation, San Francisco, CA (US)

( * ) Notice: Subject to any disclaimer, the term of this patent is extended or adjusted under 35 U.S.C. 154(b) by 0 days.

(21) Appl. No.: 13/756,294

(22) Filed: Jan. 31, 2013

(65) Prior Publication Data
US 2013/0292197 A1    Nov. 7, 2013

Related U.S. Application Data

(63) Continuation of application No. 12/893,981, filed on Sep. 29, 2010, now Pat. No. 8,388,005.

(51) Int. Cl.
  *B62K 15/00* (2006.01)
  *B62K 17/00* (2006.01)
  *B62K 11/00* (2006.01)
  *B62K 3/02* (2006.01)
  *B62K 25/00* (2006.01)

(52) U.S. Cl.
  CPC .......... *B62K 15/006* (2013.01); *B62K 3/02* (2013.01); *B62K 11/00* (2013.01); *B62K 15/008* (2013.01); *B62K 17/00* (2013.01); *B62K 25/005* (2013.01)

(58) Field of Classification Search
  USPC .................................... 280/287, 278
  See application file for complete search history.

(56) References Cited

U.S. PATENT DOCUMENTS

| | | | | |
|---|---|---|---|---|
| 3,889,974 A * | 6/1975 | Kallander | 280/251 |
| 4,842,292 A * | 6/1989 | Wang | 280/287 |
| 4,895,386 A * | 1/1990 | Hellestam et al. | 280/287 |
| 5,186,482 A * | 2/1993 | Sapper | 280/278 |
| 5,419,574 A * | 5/1995 | Krumm | 280/278 |
| 6,032,971 A * | 3/2000 | Herder | 280/278 |
| 6,799,771 B2 * | 10/2004 | Bigot | 280/278 |
| 6,877,756 B2 * | 4/2005 | Yamabe | 280/287 |
| 6,986,522 B2 * | 1/2006 | Sinclair et al. | 280/287 |
| 7,156,409 B2 * | 1/2007 | Chuang | 280/287 |
| 7,232,143 B1 * | 6/2007 | Ferguson et al. | 280/278 |
| 7,367,576 B2 * | 5/2008 | Pan | 280/278 |
| 2006/0071445 A1 * | 4/2006 | Mihelic | 280/287 |
| 2008/0303243 A1 * | 12/2008 | Ying | 280/287 |
| 2010/0066054 A1 * | 3/2010 | Chen | 280/278 |

* cited by examiner

*Primary Examiner* — Kevin Hurley
*Assistant Examiner* — Michael Stabley
(74) *Attorney, Agent, or Firm* — Blakely, Sokoloff, Taylor, Zafman LLP

(57) ABSTRACT

Embodiments of the invention describe a quadrilateral frame to be utilized by a two-wheeled vehicle. The quadrilateral frame may include front and rear vertical assemblies, top and bottom collapsible horizontal assemblies, the horizontal assemblies to collapse vertically. By collapsing the horizontal assemblies of the quadrilateral frame, it is to be understood that the space occupied by the vehicle when it is not in use is significantly reduced.

11 Claims, 9 Drawing Sheets

FOLDABLE SCOOTER

RELATED APPLICATION

This Application is a Continuation of, and claims the benefit of, U.S. patent application Ser. No. 12/893,981, filed Sep. 29, 2010.

FIELD OF THE INVENTION

Embodiments of the invention generally pertain to transportation vehicles, and more particularly to collapsible frames for two-wheeled vehicles.

BACKGROUND

Motorcycles and scooters are an attractive alternative over automobiles because of their lower cost of ownership and reduced energy consumption. One of the limitations a motorcycle or scooter has is the space occupied by the vehicle when it is not in use.

While folding bicycles are known in the art, their foldable frames are not suitable for motorized cycles, as bicycle frames are not subject to the same amounts of force and torque. Collapsible stand-up scooters are known in the art, but these solutions simply allow a user to collapse the handlebar assembly of the scooter. These solutions do not effectively reduce the space of the scooter when it is not in use.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as a discussion of other potential embodiments or implementations of the inventive concepts presented herein. An overview of embodiments of the invention is provided below, followed by a more detailed description with reference to the drawings.

DESCRIPTION

Embodiments of the invention describe a quadrilateral frame to be utilized by a two-wheeled vehicle. The quadrilateral frame may include front and rear vertical assemblies and top and bottom collapsible horizontal assemblies, the horizontal assemblies to collapse vertically. By collapsing the horizontal assemblies of the quadrilateral frame, it is to be understood that the space occupied by the vehicle is significantly reduced.

Figure 1:
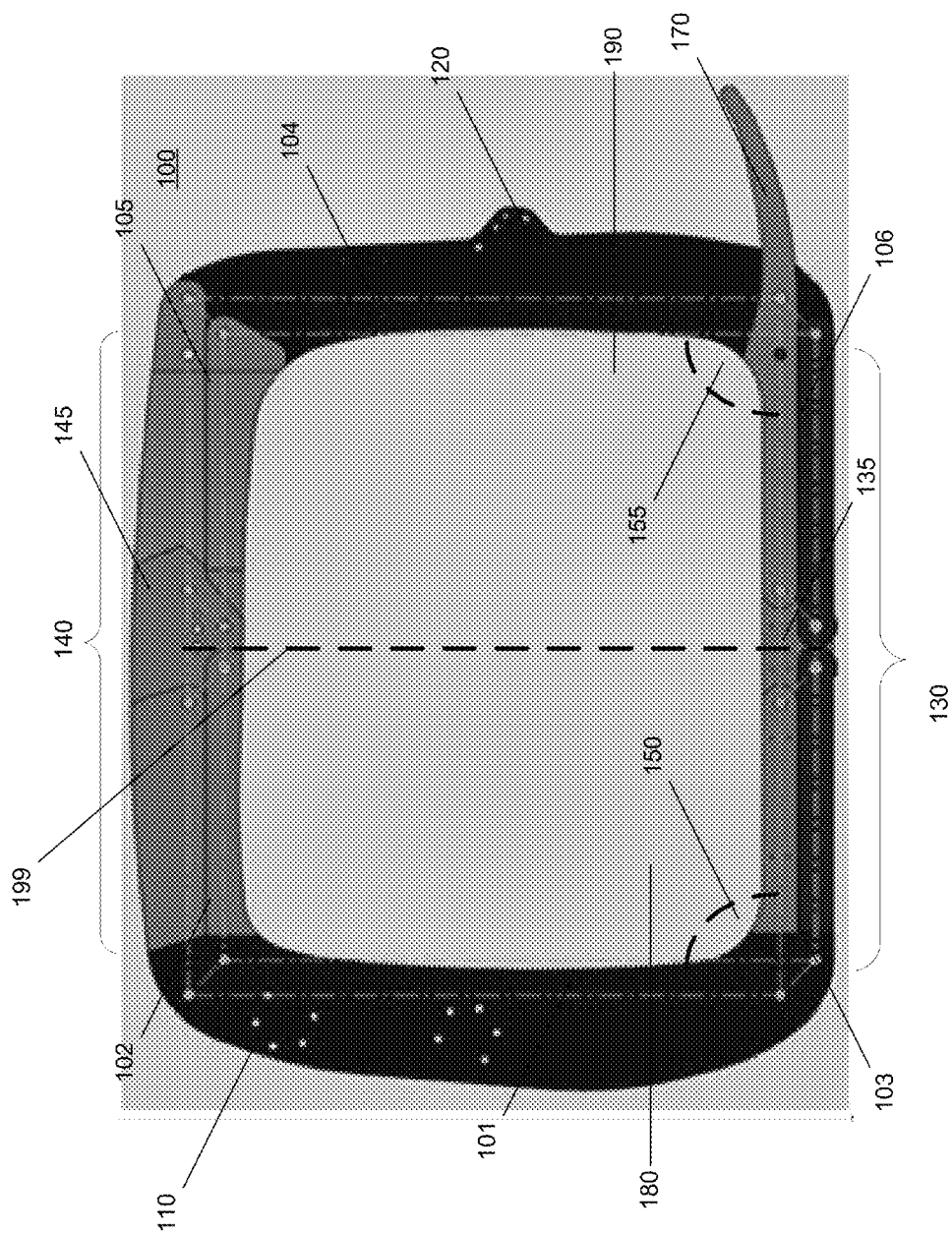
FIG. 1 illustrates a vehicle frame according to an embodiment of the invention.

FIG. 1 illustrates a vehicle frame according to an embodiment of the invention. In this embodiment, quadrilateral frame 100 is fully extended (as opposed to partially or fully collapsed, described below). In this embodiment, quadrilateral frame 100 is a relatively square frame with relatively vertical assemblies 110 and 120, and relatively horizontal assemblies 130 and 140. It is to be understood that reference to "vertical" and "horizontal" assemblies is merely to identify a first and second set of opposite assemblies. In other embodiments, the orientation and shape of quadrilateral frame 100 may be such that each assembly is neither relatively "horizontal" nor relatively "vertical." Thus, in other embodiments, the frame may be any quadrilateral shape with a first and second set of opposing (e.g., facing and parallel) assemblies.

Horizontal assemblies 130 and 140 each include center bracket portions 135 and 145, respectively. In this embodiment, center bracket portions 135 and 145 are each at the mid-point of their respective horizontal assemblies, and both allow each assembly to collapse upward as described below.

Frame 100 further includes lever 170. In this embodiment, applying downward force on lever 170 at least partially enables the collapse of horizontal assemblies 130 and 140 as described below.

Frame 100 defined and constrained by a series of arranged virtual parallelogram sub-linkages, specifically linkages 101-106. Each quadrant of frame 100 contains one of virtual parallelogram sub-linkages 101-106. These sub-linkages are related through vertical assemblies 110 and 120 and center brackets 135 and 145. In this embodiment, each vertical assembly provides a fixed relation parallelogram (i.e., virtual parallelogram sub-linkages 101 and 104).

As described below, frame 100 folds via two linked parallelograms 180 and 190, which share common virtual leg or linkage 199 (i.e., parallelogram 180 is formed by virtual parallelogram linkages 101-103 and virtual leg 199, while parallelogram 190 is formed by virtual parallelogram linkages 104-106 and virtual leg 199).

In one embodiment, parallelograms 180 and 190 behave with a mirrored relationship due to a geared sub-assembly included in horizontal assembly 130 as described below. The geared sub-assembly causes angles 150 (formed by assemblies 110 and 130) and 155 (formed by assemblies 120 and 130) to remain equal to each other in all frame states (i.e., any state between and including extended and collapsed).

In this embodiment, while frame 100 is in the neutral position (i.e., extended), virtual sub-linkages 101-106 are mirrored over the vertical axis (e.g., virtual leg 199), but not necessarily the horizontal axis—i.e., virtual sub-linkage 101 is mirrored with virtual sub-linkage 104, virtual sub-linkage 102 is mirrored with virtual sub-linkage 105 and virtual sub-linkage 103 is mirrored with virtual sub-linkage 106.

Said virtual sub-linkages are, however, copied and patterned equidistant from the horizontal axis. It is important to note in this embodiment the smallest effective linkages are defined by the connection of two opposite corners of a square (or the larger leg of a 45-45-90 triangle). In alternative embodiments however, the folding mechanism may be replicated with effective sub-linkages defined by opposite corners of any quadrilateral.

Figure 2:
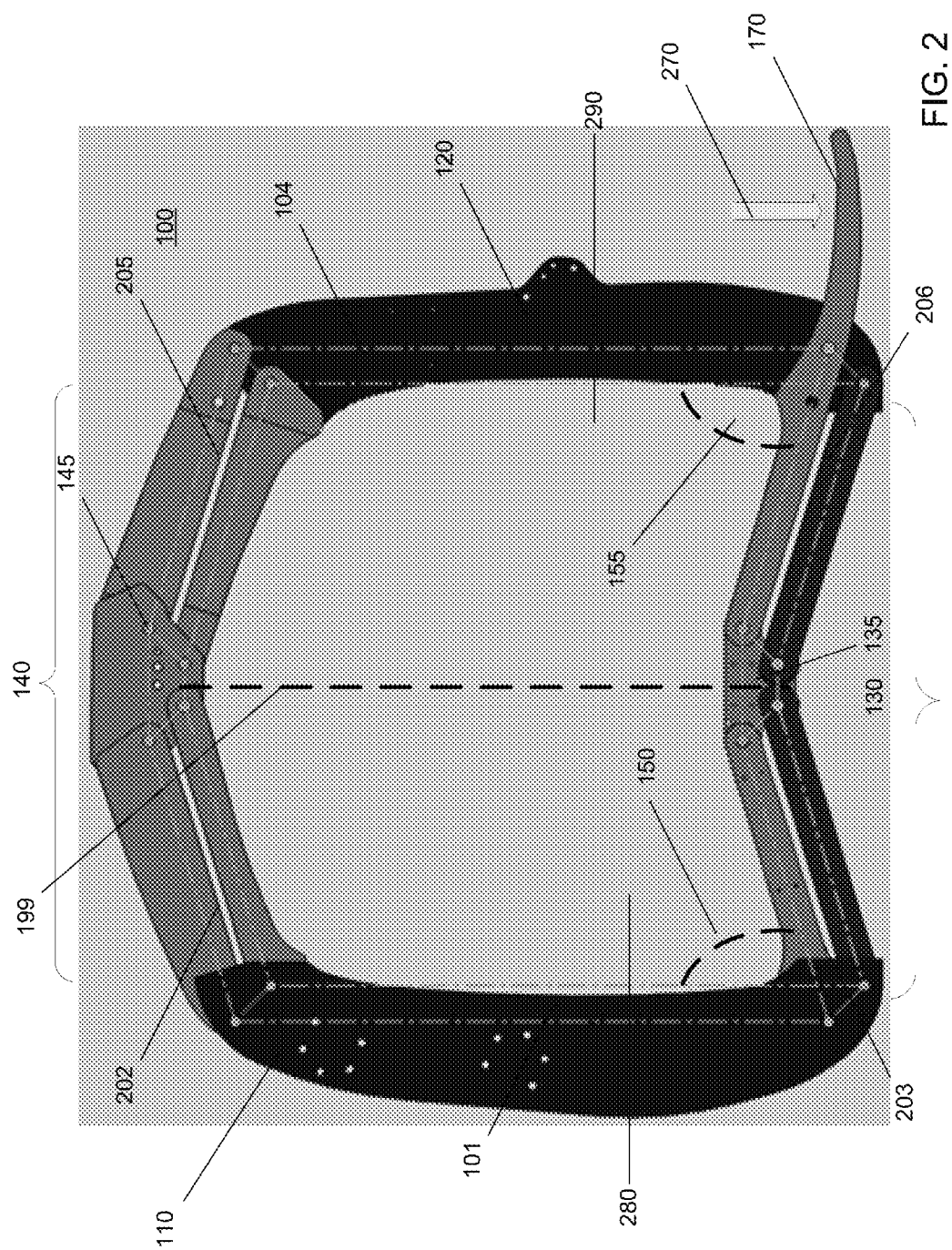
FIG. 2 is an illustration of a vehicle frame partially folded or collapsed according to an embodiment of the invention.

FIG. 2 is an illustration of a vehicle frame partially folded or collapsed according to an embodiment of the invention. In this embodiment, the partial collapse of frame 100 is initiated at least in part by downward force 270 applied to lever 170.

In this illustration, it is clear that mirrored linkage geometry (i.e., parallelograms 280 and 290) causes vertical assemblies 110 and 120 to remain parallel at all times. In this state of partial collapse, along with parallelograms 280 and 290, all virtual sub-linkages except sub-linkages 101 and 104 have changed (i.e., virtual sub-linkages 202, 203, 205 and 206) with respect to FIG. 1.

Parallelograms 280 and 290 behave with a mirrored relationship due to the geared sub-assembly included in horizontal assembly 130 as described below. As discussed above, the gear assembly causes angles 150 (formed by assemblies 110 and 130) and 155 (formed by assemblies 120 and 130) to remain equal to each other at all times.

Figure 3:
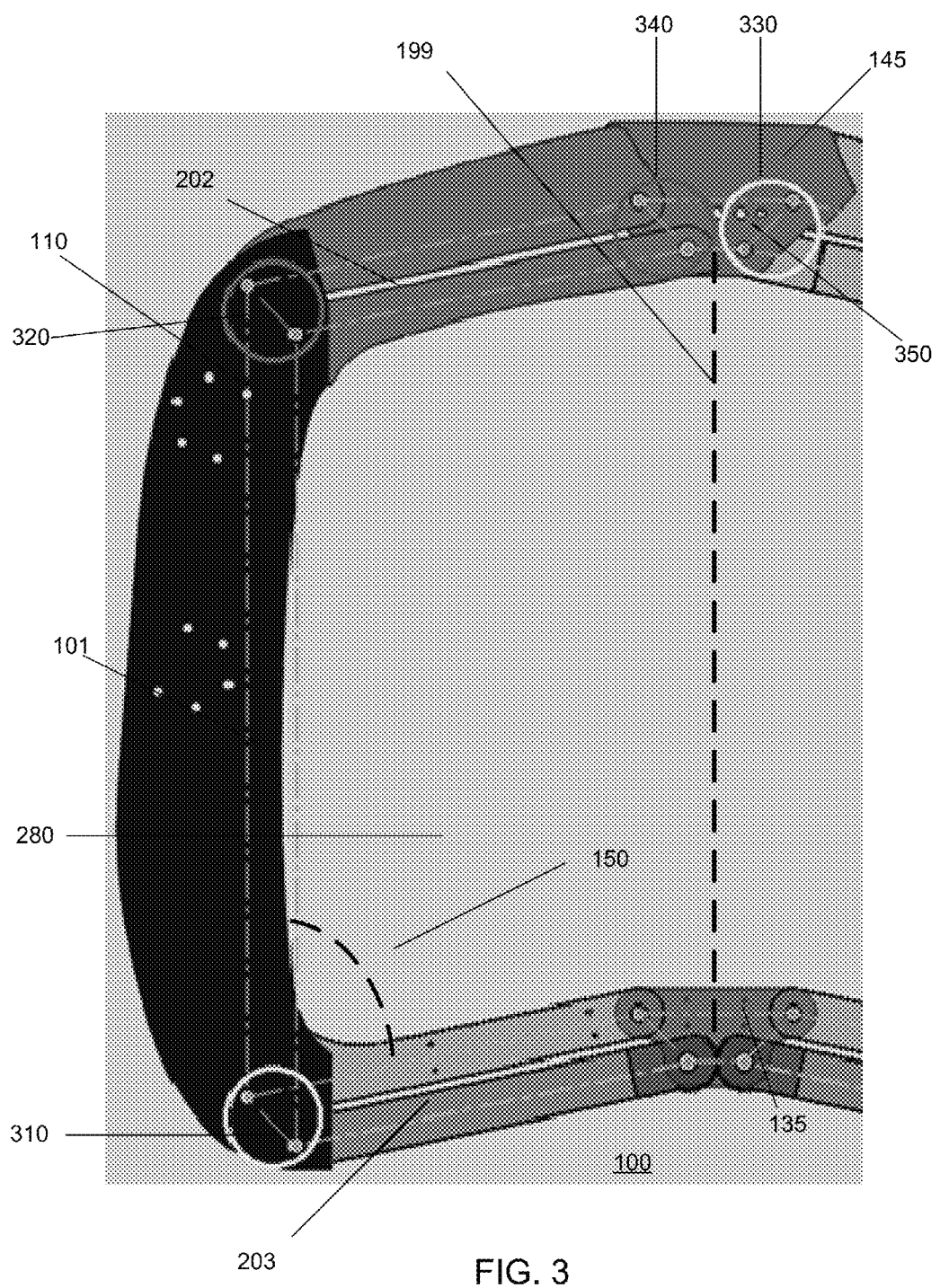
FIG. 3 is an illustration of individual virtual sub-linkages according to an embodiment of the invention.

FIG. 3 is an illustration of individual virtual sub-linkages according to an embodiment of the invention. In this embodiment, small virtual linkages 310 and 330 have direct and fixed relationships with two other small virtual linkages, 320 and 340, respectively. Thus, virtual sub-linkages 202 and 203 are equal, as are virtual sub-linkage 101 and virtual leg 199, thereby creating parallelogram 280.

In this embodiment, small linkage 330 is solidly linked to its mirrored counterpart, small linkage 340, thereby creating anchored constant isosceles trapezoid 350. Therefore virtual linkage 202 has a constant mirrored relationship with virtual linkage 205 (as seen in FIGS. 1-2).

Furthermore, small linkages 310 and 320 are the same length, parallel and have fixed positions due to vertical assembly 110 being of fixed length and position. Thus, virtual linkage 101 is constant throughout the various stages of frame 100 between extended and collapsed.

Figure 4:
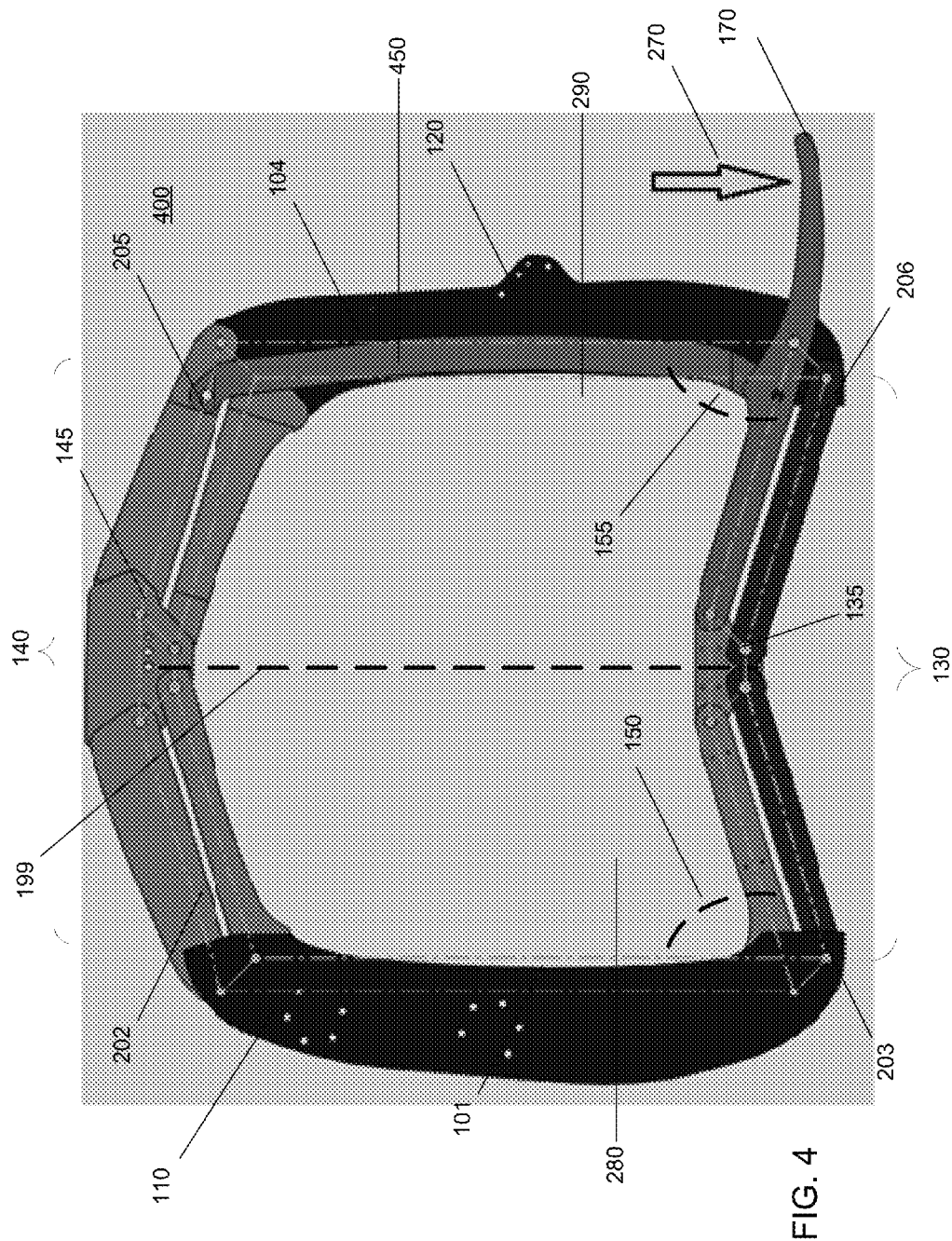
FIG. 4 is an illustration of a vehicle frame partially folded or collapsed according to an embodiment of the invention.

FIG. 4 is an illustration of a vehicle frame partially folded or collapsed according to an embodiment of the invention. In this embodiment, frame 400 is similar to partially collapsed frame 100 as described in FIG. 2 (thus, including the same virtual linkages). In this embodiment, additional vertical assembly 450 is coupled to horizontal assemblies 130 and 140 to provide a mechanical advantage for assisted folding. By applying downward force 270 to lever 170, force is applied to both horizontal assemblies 130 and 140, thereby adding mechanical advantages to the folding mechanism compared to the embodiments described in FIGS. 1-2.

Figure 5:
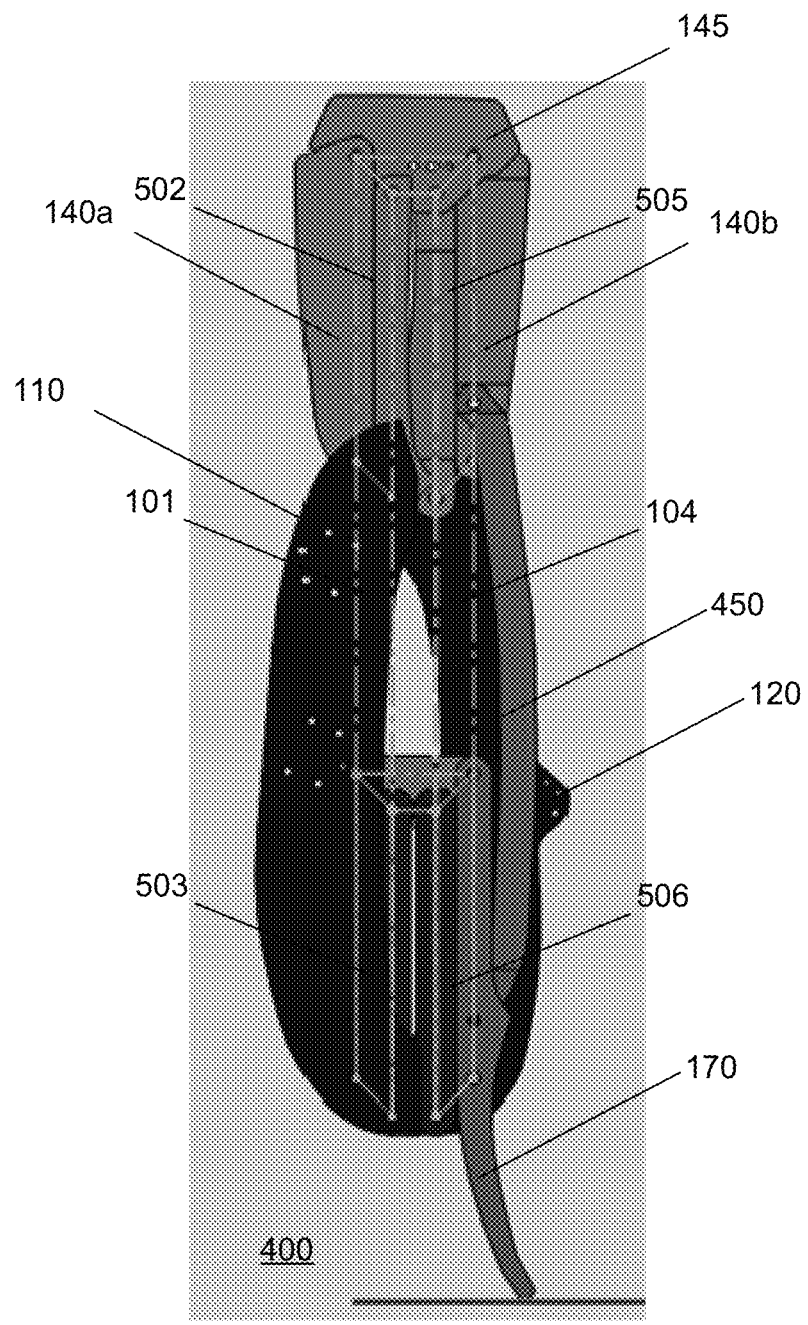
FIG. 5 is an illustration of a collapsed vehicle frame according to an embodiment of the invention.

FIG. 5 is an illustration of a collapsed vehicle frame according to an embodiment of the invention. In this embodiment, frame 400 is completely folded because horizontal assemblies 130 (not shown) and 140 (as shown in parts 140a and 140b) are completely folded. Similar to the previously described vehicle frames, virtual sub-linkage 502 is mirrored with virtual sub-linkage 505, while virtual sub-linkage 503 is mirrored with virtual sub-linkage 506.

Figure 6A:
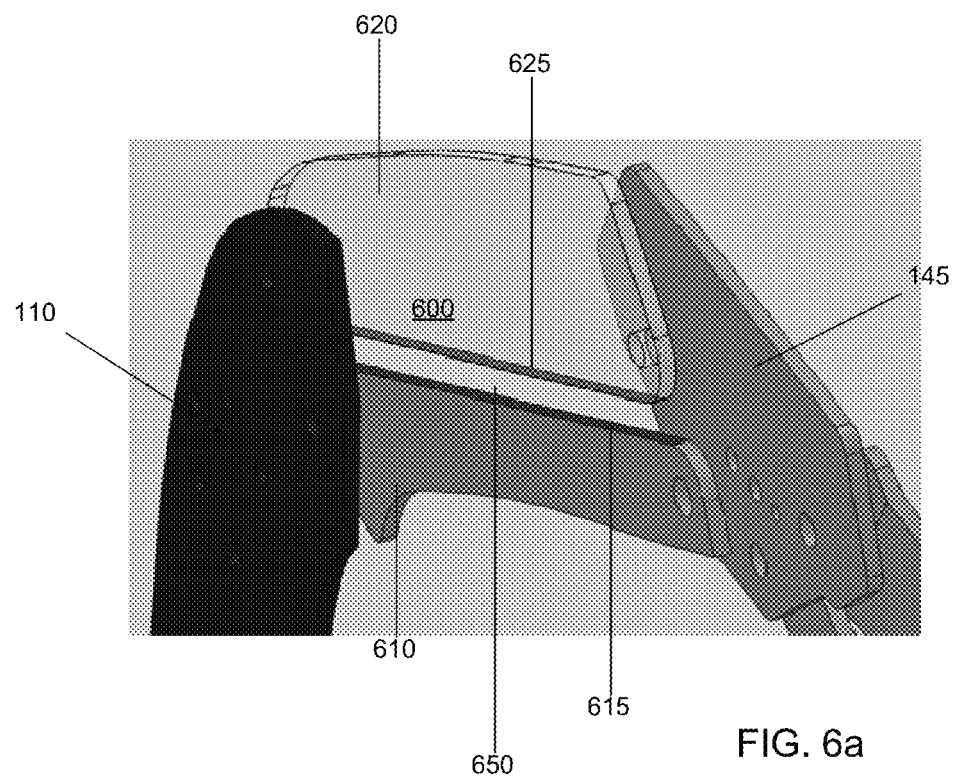
FIG. 6a is an illustration of a parallel linkage subsystem according to an embodiment of the invention.

FIG. 6a is an illustration of a parallel linkage subsystem according to an embodiment of the invention. Parallelogram linkage subsystem 600 may be included in any horizontal assembly described above. Subsystem 600 provides a mechanical stop to prevent the entire frame (e.g., frames 100 and 400 as described above) from folding in the wrong direction and "over-folding."

In one embodiment, face 625 of horizontal subcomponent 620 meets or connects with face 615 of counterpart horizontal subcomponent 610 when the respective frame is in the neutral (i.e., unfolded) position. It is to be understood that this embodiment prevents center bracket 145 from moving to a lower than desired position (i.e., the embodiment prevents the frame from folding in the wrong direction). It is to be understood that the connection of the horizontal subcomponents in the completely folded position (as shown in FIG. 5, elements 140a and 140b) similarly prevents "over-folding" of the respective frame. In some embodiments, the horizontal subcomponents of a vehicle are further reinforced by a locking mechanism to prevent undesirable folding.

Figure 6B:
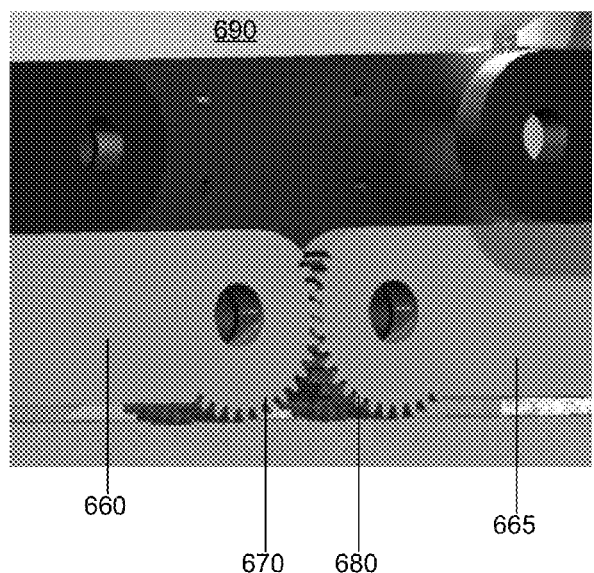
FIG. 6b is an illustration of a geared linkage subsystem according to an embodiment of the invention.

FIG. 6b is an illustration of a geared linkage subsystem according to an embodiment of the invention. Geared linkage subsystem 690 may be included in any horizontal assembly described above. In this embodiment, each of horizontal subcomponents 660 and 665 are geared assemblies designed to maintain constant virtual sub-linkages as described above. Said geared assemblies prevent unequal angles of folding (e.g., angles 150 and 155 in FIGS. 1-2) for the respective horizontal assembly.

Figure 7B:
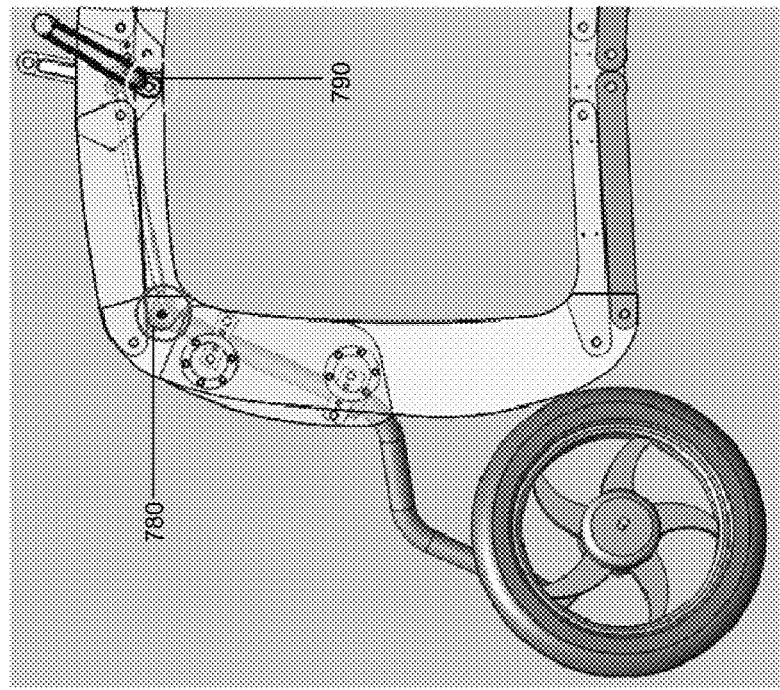
FIGS. 7a & 7b are illustrations of a steering system according to an embodiment of the invention.
Figure 7A:
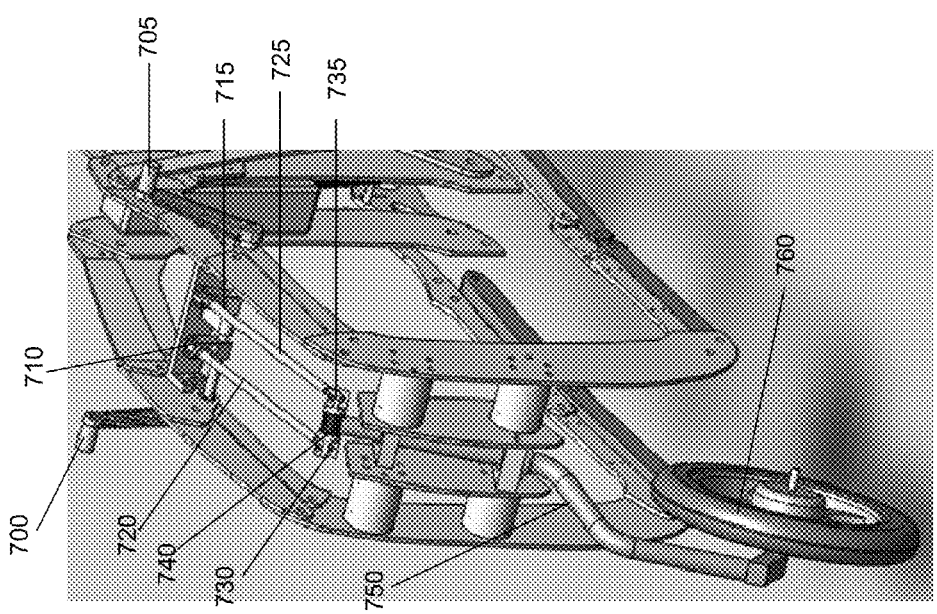

FIG. 7a is an illustration of a steering system according to an embodiment of the invention. In one embodiment, a collapsible frame includes right handlebar 700 and left handlebar 705. In this embodiment, applying forward force on right handlebar 700 causes front wheel 760 to rotate counterclockwise (from the riders perspective) or turn the vehicle left; applying forward force on left handlebar 705 causes front wheel 770 to rotate clockwise (from the riders perspective) or turn the vehicle right.

The steering functionality described above is achieved via a directed link from handlebars 700 and 705 to respective small brackets 710 and 715 respectively. Straight linkages 720 and 725 each include pivots on their ends and are each coupled to mechanical advantage brackets 710 and 715 respectively. The straight linkages are further coupled to devises 730 and 735, respectively. The clevises are each further coupled to pivot block 740. This block is further coupled to the fork 750 (which is coupled to front wheel 760). Therefore, steering torque is transmitted as follows: handlebars (700, 705) to mechanical advantage brackets (710, 715) to devises (720, 725) to pivot block 740 to fork 750.

The geometry of the steering system described above, along with the position of handlebars 700 and 705, allow the steering components to remain uninterrupted as the frame undergoes folding and unfolding. As shown in FIG. 7b, the center of pivot block 740 (defined by the intersection of clevises' 720 and 725 rotation axes and the connect axis of fork 750) is aligned with pivot point 780 of the folding frame. Handlebars 700 and 705 are connected to the steering system at pivot point 790 that remains at a constant distance from pivot point 780 in all frames states (i.e., any states between and including folded and unfolded). Therefore, a trianglular relationship is created between the center of clevis pivot block 740, the lower pivot axis of mechanical advantage bracket 710 and the upper pivot axis of mechanical advantage bracket 710 (and similarly, a trianglular relationship is created between the center of clevis pivot block 740, the lower pivot axis of mechanical advantage bracket 715 and the upper pivot axis of mechanical advantage bracket 715). This triangular relationship is constant during all frame states, thus the steering system described above is functional and geometrically consistent with the frame in all frame states. This geometry may also cause front wheel 760 to align itself in the neutral position when folding is initiated.

Figure 8:
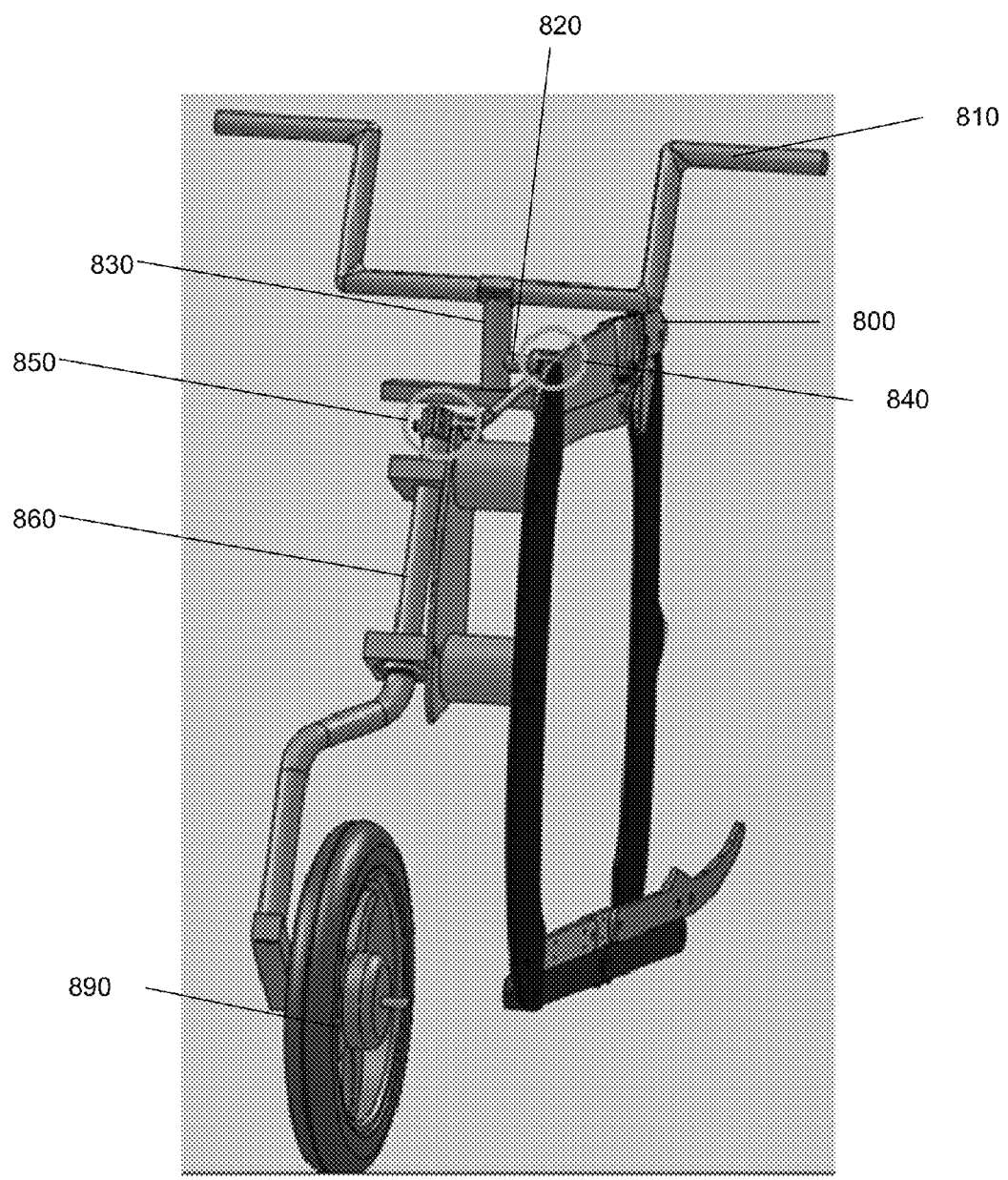
FIG. 8 illustrates a steering system according to an embodiment of the invention.

FIG. 8 illustrates a steering system according to an embodiment of the invention. In this embodiment, the steering system includes handlebars 810 to turn front wheel 890. Handlebars 810 may be coupled to horizontal linkage 820 of collapsible assembly 800 via mounting post 830. Said mounting post may pivot with handlebars 810 and is further coupled to first custom multi-pivot connector 840. Said multi-pivot connector may be further coupled to a second multi-pivot connector 850, which is coupled to steering column 860. Thus, force applied to handlebars 810 is translated to front wheel 890 via the components described above. It is to be understood that while assembly 800 folds (along with the opposing horizontal assembly, as described above), handlebars 810 remain constantly related to the pivoting horizontal member, thereby allowing for uninterrupted frame folding.

Figure 9:
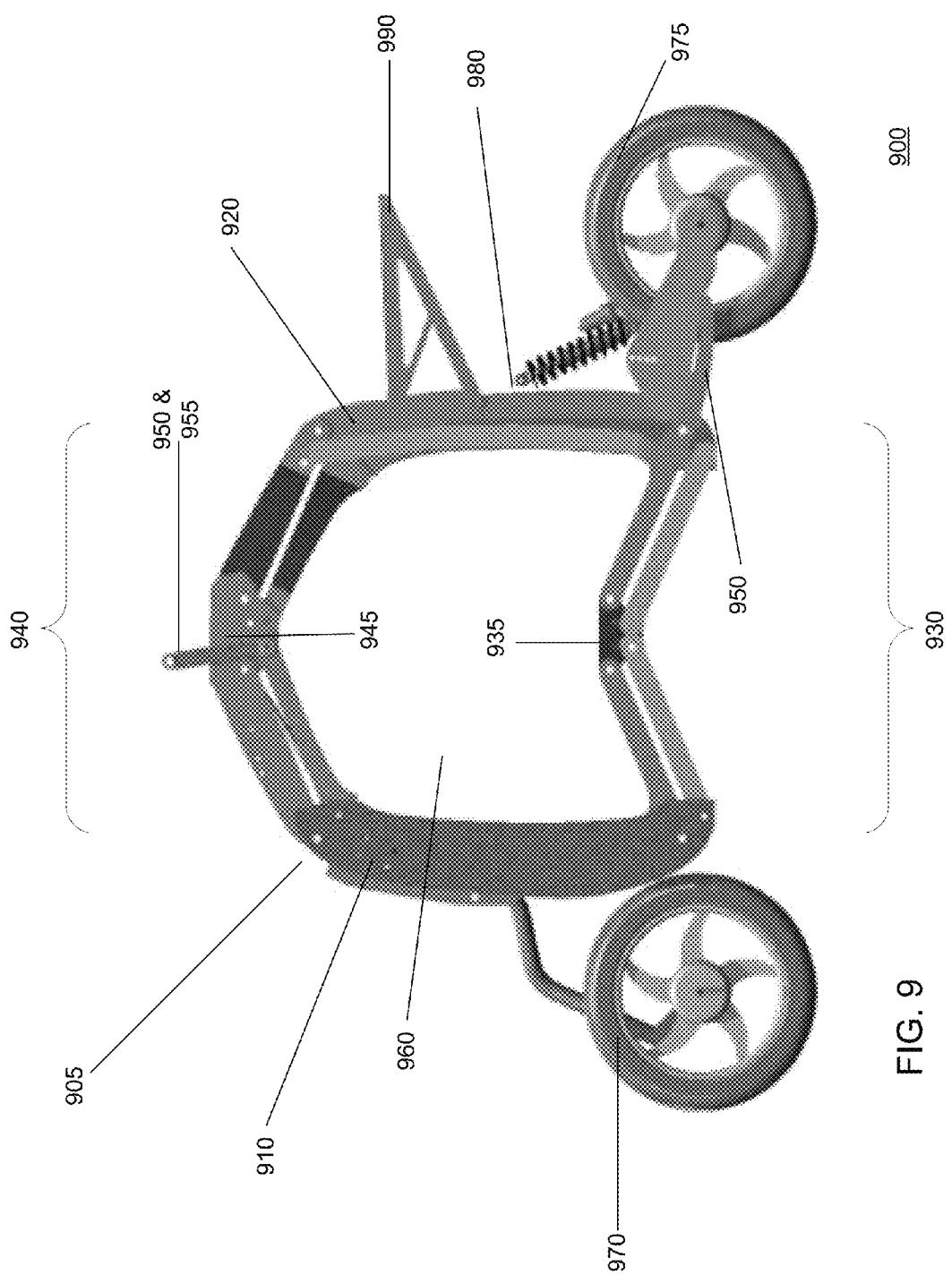
FIG. 9 illustrates a vehicle according to an embodiment of the invention.

FIG. 9 illustrates a vehicle according to an embodiment of the invention. In this embodiment, vehicle 900 includes quadrilateral frame 905, shown here in a partially folded state (as opposed to fully collapsed, or fully extended as described above). In this embodiment, quadrilateral frame 905 includes vertical assemblies 910 and 920, and horizontal assemblies 930 and 940. In this embodiment, quadrilateral frame 905 has a rectangular shape when fully extended, with horizontal frames 930 and 940 each longer than vertical assemblies 910 and 920.

Horizontal assemblies 930 and 940 each include brackets 935 and 945, respectively, to enable the assemblies to fold (i.e., collapse). In this embodiment, brackets 935 and 945 are each at the mid-point of their respective horizontal assemblies, and both allow each assembly to collapse upward. In some embodiments, the vehicle 900 further includes a locking mechanism to help maintain frame 905 in an extended or folded state.

Vehicle 900 also includes lever 950. In this embodiment, applying downward force on the lever at least partially enables the collapse of horizontal assemblies 930 and 940 (the collapse of the assemblies may be further enabled by a user applying an upward force to handlebars 950 and 955). In one embodiment, vehicle 900 includes a second lever on the opposite side of lever 950, which may work independently or may be coupled with lever 950.

Center space or void 960 is eliminated when vehicle 900 is folded completely as described above (e.g., in FIG. 5). In some embodiments, the horizontal and vertical assemblies of frame 905 may be of a certain length such that void 960 may accommodate appropriate sized cargo.

Vehicle 900 may further include front wheel 970 and rear wheel 975, each coupled to frame 910. In this embodiment, front wheel 970 is coupled to vertical assembly 910 and rear wheel 975 is coupled to both vertical assembly 920 and horizontal assembly 930. It is to be understood that in other embodiments, front wheel 970 and rear wheel 975 may be coupled to different parts and locations of vehicle frame 905. In this embodiment, front wheel 970 and rear wheel 975 support vehicle 900 in all vehicle states. In other embodiments, after approximately a 90 degree rotation, lever 950 is able to act as a center stand for vehicle 900 (i.e., rear wheel 975 is raised off the ground).

Vehicle 900 further includes motor 980 positioned below seat 990 to drive rear wheel 975. In one embodiment, motor 980 is included within vertical assembly 920 so as not to affect the movement (i.e., collapsibility) of frame 905.

Those skilled in the art will recognize that numerous modifications and changes may be made to the described embodiments without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

Methods and processes, although shown in a particular sequence or order, unless otherwise specified, the order of the actions may be modified. Thus, the methods and processes described above should be understood only as examples, and may be performed in a different order, and some actions may be performed in parallel. Additionally, one or more actions may be omitted in various embodiments of the invention; thus, not all actions are required in every implementation. Other process flows are possible.

The invention claimed is:

1. An apparatus comprising:
   a quadrilateral frame comprising a foldable frame and including:
      a first vertical assembly and a second vertical assembly; and
      a first collapsible horizontal assembly and a second collapsible horizontal assembly, the first collapsible horizontal assembly positioned above the second collapsible horizontal assembly, both collapsible horizontal assemblies to collapse vertically and in a same direction;
   a front wheel and a rear wheel, both wheels coupled to the quadrilateral frame; and
   a lever coupled to the second collapsible horizontal assembly of the quadrilateral frame, the second collapsible horizontal assembly to collapse in response to a force applied to the lever;
   wherein the front wheel and the rear wheel are positioned to be capable of at least partially supporting the apparatus when the first collapsible horizontal assembly and second collapsible horizontal assembly of the quadrilateral frame are in a collapsed state.

2. The apparatus of claim 1, wherein the first collapsible horizontal assembly and the second collapsible horizontal assembly of the quadrilateral frame to collapse vertically and away from the front wheel and the rear wheel.

3. The apparatus of claim 1, wherein at least one of the first collapsible assembly or the second collapsible horizontal assembly of the quadrilateral frame comprises:
   a first geared sub-assembly coupled to the first vertical assembly; and
   a second geared sub-assembly coupled to the first geared sub-assembly and the second vertical assembly, wherein the first geared sub-assembly and the second geared sub-assembly are geared to control a collapse for the respective first or second collapsible horizontal assembly.

4. The apparatus of claim 1, wherein the front wheel is placed in front of the rear wheel when the quadrilateral frame is a folded state and when the quadrilateral frame is in an unfolded state, and the apparatus further comprises:
   a steering system included in at least the first collapsible horizontal assembly and the first vertical assembly of the quadrilateral frame, the steering system able to steer the apparatus when the quadrilateral frame is in the folded state and when the apparatus is in the unfolded state.

5. The apparatus of claim 4, further comprising:
a locking mechanism to lock the quadrilateral frame in at least one of the folded state or the unfolded state.

6. The apparatus of claim 1, wherein the lever comprises a rotatable level for lifting the rear wheel and supporting the quadrilateral frame when the quadrilateral frame is in a folded state.

7. The apparatus of claim 1, further comprising:
a motor included in the second vertical assembly of the quadrilateral frame to drive the rear wheel.

8. A foldable quadrilateral vehicle frame comprising:
a set of opposing non-collapsible assemblies;
a first collapsible assembly coupled to the set of opposing non-collapsible assemblies;
a second collapsible assembly coupled to the set of opposing non-collapsible assemblies and positioned opposite the first collapsible assembly, wherein the first collapsible assembly and the second collapsible assembly to collapse in a same direction; and
a lever coupled to one of the first collapsible assembly or the second collapsible assembly, the respective collapsible assembly to collapse in response to a force applied to the lever.

9. The foldable quadrilateral vehicle frame of claim 8, wherein at least one of the first collapsible assembly or the second collapsible assembly includes:
a first geared sub-assembly coupled to a first assembly of the set of opposing non-collapsible assemblies; and
a second geared sub-assembly coupled to the first geared sub-assembly and a second assembly of the set of opposing non-collapsible assemblies, the sub-assemblies geared to control a collapse for the respective first or second collapsible assembly.

10. The foldable quadrilateral vehicle frame of claim 8, further comprising:
a locking mechanism to lock the foldable quadrilateral vehicle frame in at least one of a folded state or an unfolded state.

11. A foldable quadrilateral vehicle frame comprising:
a set of opposing non-collapsible assemblies;
a first collapsible assembly coupled to the set of opposing non-collapsible assemblies;
a second collapsible assembly coupled to the set of opposing non-collapsible assemblies and positioned opposite the first collapsible assembly, wherein the first collapsible assembly and the second collapsible assembly to collapse in a same direction; and
a lever coupled to one of the first collapsible assembly or the second collapsible assembly, the respective collapsible assembly to collapse in response to a force applied to the lever;
wherein at least one of the first collapsible assembly or the second collapsible assembly includes:
a first geared sub-assembly coupled to a first assembly of the set of opposing non-collapsible assemblies; and
a second geared sub-assembly coupled to the first geared sub-assembly and a second assembly of the set of opposing non-collapsible assemblies, the sub-assemblies geared to control a collapse for the respective first or second collapsible assembly.

* * * * *